Dec. 17, 1946.  J. N. BLANK  2,412,558
METER INSTALLATION FIXTURE
Filed Sept. 12, 1942   2 Sheets-Sheet 1
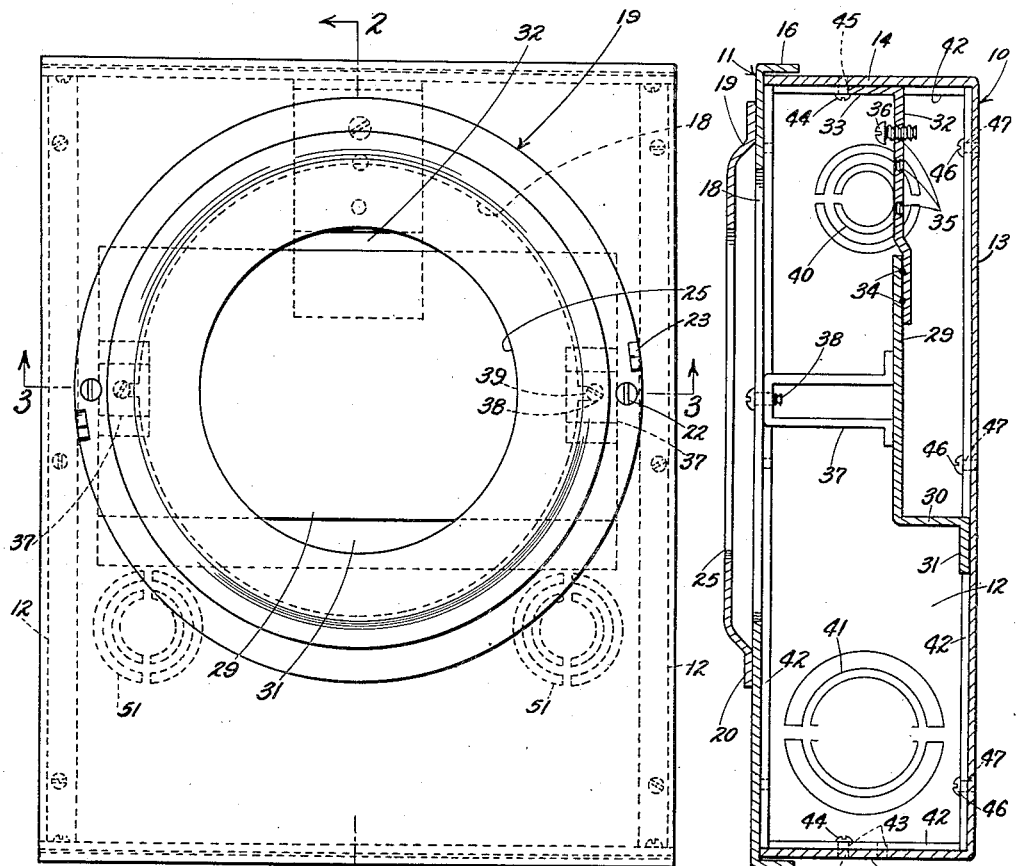
INVENTOR.
Joseph N. Blank
BY
Murray, Sackhoff + Paddack
ATT'YS Dec. 17, 1946.   J. N. BLANK   2,412,558
METER INSTALLATION FIXTURE
Filed Sept. 12, 1942   2 Sheets-Sheet 2

INVENTOR.
Joseph N. Blank
BY
Murray, Sackhoff & Paddack
ATT'YS

Patented Dec. 17, 1946

2,412,558

UNITED STATES PATENT OFFICE 2,412,558

METER INSTALLATION FIXTURE

Joseph N. Blank, Newport, Ky., assignor to The Wadsworth Electric Manufacturing Company, Covington, Ky., a corporation of Kentucky Application September 12, 1942, Serial No. 458,160

10 Claims. (Cl. 175—224)

The present invention relates to electric meter installations and has for an object the provision of a universal installation fixture adapted to receive in substantially tamper-proof condition the various makes of electric meters of the several well-known types.

Another object of the invention is to provide a meter installation fixture with an apertured closure member adapted to have the clock-work of any meter project therethrough, and a meter trim member apertured to accommodate a specific meter and mounted on the closure member, the outermost of the said members sealably secured for retaining such meter and all mechanical and electrical connections within the fixture concealed and inaccessible.

A further object of the invention is to provide an electric meter installation fixture adaptable for a wide variety of meters and effective for use as an individual meter box or, in conjunction with other fixtures, as a trough unit for the installation of more than one meter of similar or dissimilar types or makes.

A still further object of the invention is to provide a meter installation fixture comprising removable end walls which are interchangeable and reversible, whereby to accommodate individual and banked meter installations as required and without need for a large number of special parts.

A further object of the invention is to provide meter installation fixtures that are readily assemblable on the job in accordance with the requirements thereof, the assembly connections being rendered inaccessible upon the final mounting and sealing of one of a pair of superposed closure members.

These and other objects are attained by the means described herein and disclosed in the accompanying drawings, in which:

Fig. 1 is a front elevational view of a meter box comprised of the installation fixture of the invention and including the meter trim in operative position.

Fig. 2 is a cross-sectional view taken on line 2—2 of Fig. 1.

Fig. 3 is a cross-sectional view taken on line 3—3 of Fig. 1.

Fig. 5 is a fragmental perspective view showing a trough member of the invention with means for connecting another similar trough member to the end thereof.

Figure 6:
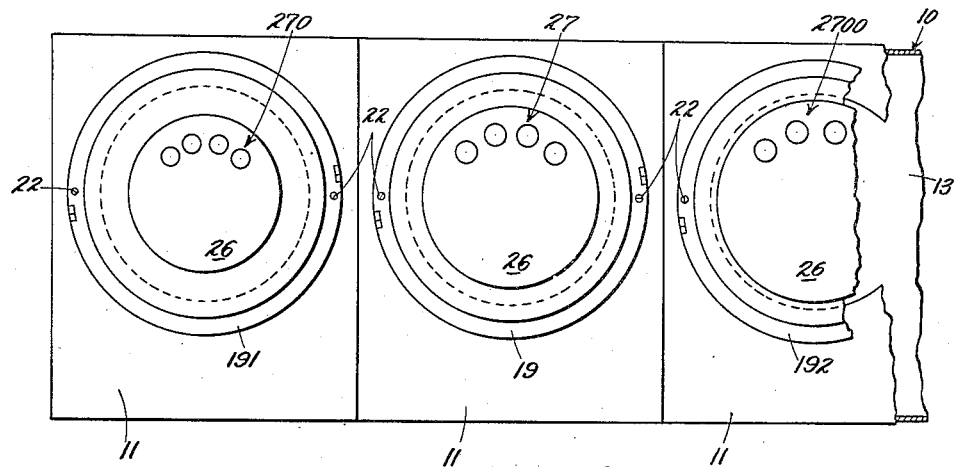
Fig. 6 is a front elevational view of a gang installation of several sizes of electric meters by the means of the invention.

There are numerous makes of electric meters variously used throughout the country by different power companies. There are also several general types of meters commonly known as base type or type A meters and socket type or S type meters, and the meter fixtures for the several kinds and types of meters have heretofore been unsuited to accommodate more than one make or type of meter. The expense of carrying stocks of meter fixtures for the various meters, and the irregularities and difficulties encountered have frequently been met by crudely cobbled fixtures from the tin shop of the utility company or elsewhere.

The present invention seeks to eliminate the necessity for individualized fixtures for electric meters and to reduce the problem now encountered by the utility companies to a minimum. Fixtures embodying the invention may be used singly with end wall pieces for the installation of a single meter box, or if required, they may be arranged for ganging in multiple and easily and inexpensively adapted for the installation of a number of meters of similar or dissimilar makes and/or types. It will be appreciated that by means of the invention it is possible for the installing contractor to purchase and furnish the cabinet or trough element with its principal closure member without regard to the type or particular make of meter that may subsequently be installed therein by the utility company, while the latter company will need to carry in stock only the meter trims or cooperating closure members that are suited to the meters which it uses.

Referring now to the drawings, and particularly to Fig. 2, the fixture of the invention comprises a unit consisting of a trough or cabinet forming member 10 with a removable cover 11 and interchangeably mounted end walls 12. The trough 10 is formed of a metal sheet and comprises a rear wall 13 with a top wall 14 and a bottom wall 15 projecting forwardly therefrom and adapted to receive the cover 11 at the free edges. Cover 11 has a top flange 16 and bottom flange 17 and is devoid of side flanges. Cover 11 has a large aperture 18, circular in shape and adapted to have the cylindrical body of the meter to be mounted to pass therethrough. Removably secured over aperture 18 and the surrounding face of cover 11 is a meter trim 19 in the form of a ring which may be flat, concave or convex, depending upon the depth of the trough or the depth of the meter employed as will hereinafter be more fully understood. The trim 19 will constitute the only part which need be carried in a variety of sizes in order to accommodate a variety of meters. The trims 19 will in each instance be an annular ring with at least a marginal flat portion 20 which is of greater diameter than the opening 18 in the removable cover 11. Rim 20 has holes 21 to accommodate suitable screws 22 which engage in tapped holes in corresponding portions in cover 11 so that the aperture in trim 19 is concentric with the aperture 18 in the cover. Adjacent the periphery of the rim 20 the metal is slit and turned up to make an open inverted V-shaped portion 23 which permits a sealing wire W to be passed therethrough and thence through a bore 24 in the adjacent sealable screw 22. In the embodiment shown in Figs. 1 to 3, the trim 19 constitutes the final element to be attached in a meter installation and the attachment and sealing thereof renders all other mechanical and electrical connections within the fixture inaccessible and concealed. In practice many of the different meter trims 19 will differ only in the diameter of the center aperture 25 which is in each instance made of such size as to permit the cylindrical clock-work casing 26 of a given meter 27 to pass through it while the usual shoulder 28 of the meter is engaged by the inside face of trim 19 immediately surrounding the aperture 25, (see dotted line showing in Fig. 3).

The depth of the trough and the depth of the meter up to the shoulder will govern the necessary location of the plane of the aperture in the trim 19. That is to say, under certain conditions of the depth of the trough and a particular meter, the trim may be entirely flat or it may be concave instead of convex, as shown.

In Figs. 2 and 3 a meter support member 29 is provided and suitably mounted in spaced relation to the rear wall 13 of trough 10 as by forming an integral leg 30 with a foot or flange 31 spot-welded to said wall 13. A meter support bracket 32 has a foot or flange 33 secured to the top wall 14 as by spot-welding, while the opposite end is offset to pass along the rear face of meter support 29, and is suitably secured as by spot-welding at 34. The bracket 32 has a number of tapped holes 35 to selectively receive screw 36 in mounting the meter base. On opposite sides of the meter support 29 are stirrup-shaped cover supports 37 which form small flat seats with tapped holes therein for receiving screws 38 which pass through holes or slots 39 on diametrically disposed sides of the aperture 18 of cover 11 and whereby the cover is secured to the seats. When trim member 19 is mounted in superposed relation on the cover and the mounting screws 22 therefor are secured and sealed, the screws 38 are inaccessible and concealed.

The end walls 12 are provided near opposite ends with knock-outs 40 and 41 which are preferably of different sizes. The end wall 12 has a continuous flange 42 extending from one face thereof and this flange has in its narrow ends a pair of perforations 43 uniformly spaced centerward from the longer flange portions. The end walls 12 are interchangeable and in mounting and securing the same to the top and bottom walls 14 and 15 of the trough, a screw 44 is passed through one of said pair of holes 43 into a matching tapped hole 45 in said walls 14 and 15. The screws 44 are entered from the inside of the trough, and the structure is thereby made tamper-proof when the fully enclosed meter is properly mounted and sealed. In a corresponding fashion the longitudinal flange portions 42 are provided with holes for receiving screws 46 which match with tapped holes 47 in rear wall 13. From the foregoing it will be noted that an end wall 12 may be mounted on either the righthand or lefthand end of trough 10 with either the knock-out 40 or 41 at the top, thus accommodating the fixture to any desired size and location of wiring conduits.

In the event a plurality of the trough members 10 are to be mounted in end to end relation, for the reception of a plurality of meters, the intermediate end walls 12 are omitted, and in lieu thereof a U-shaped member 48 approximately twice as wide as a flange 42 of an end wall is employed. The member 48 has a double row of holes 49 for the reception of screws such as 44 and 46 for rigidly connecting a pair of troughs 10 in edge to edge communicating relation.

The mounting of the trough units 10 upon a wall surface may be effected by passing securing means such as screws, nails and the like (not shown), through holes 50 spaced inwardly from the four corners of the rear wall 13. The rear wall 13 is also provided with suitable knock-outs 51 below the level of foot 31. Both the top and bottom walls 14—15 are provided with knock-outs such as 52, and these knock-outs may also bear a relatively different position if desired.

The specific mounting of a meter socket or the base of the so-called A type meters on the meter support will vary with different meters, and such means form no part of the present invention.

Figure 4:
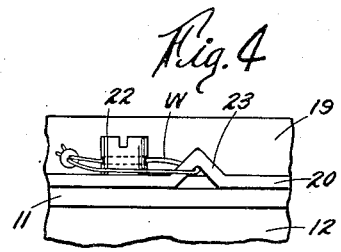
Fig. 4 is an enlarged fragmental view taken on line 4—4 of Fig. 3.

In practical use, a proposed meter installation is effected by securing one or more of the trough members 10 as required in the desired position. If a plurality of the troughs are to form a continuous, interiorly communicating cabinet or trough unit as shown in Fig. 6, members 48 are applied interiorly to overlap the edge butting joints of the several troughs in a manner that will be readily understood from an inspection of Fig. 5. The end walls 12 are provided at the extreme ends of such trough or troughs, whereupon the available or specified meter or meters, such as 27, 270 and 2700, of one or more makes and/or types are mounted in position and the cover members 11 are fastened down over the respective units. Thereafter the meter trim closure elements 19, 191 and 192 are selected to accommodate the outside diameters of the projecting, encased clock-work mechanisms 26 of each of the said meters, and are set in place to seat over the shoulders 28 of the several meters, whereupon they are fastened in superposed relation on the covers by screws 22 which may be suitably sealed, as shown for example in Fig. 4, after the installation is inspected and tested.

Figure 7:
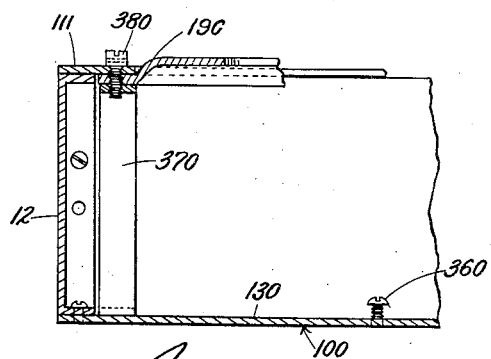
Fig. 7 is a fragmental sectional view showing a modified form of the device of the invention.

In the modification shown in Fig. 7 the meter support and meter support bracket of Fig. 2 are omitted and the meter base or socket may be supported by the back wall 130 of the trough or cabinet element 100. A screw 360 threaded into said wall serves to fix the meter base or socket in place. In this embodiment the cover support element 370, corresponding to element 37 of Fig. 2, is suitably attached to wall 130 as by spot welding. I have also arranged to have the meter trim ring 190 seat on the cover support 370 and the cover 111 superposed on top of it and sealing screws 380 passing through both of these apertured closure members 111 and 190 and threadedly engaging in the cover support 370. In this manner two of the screws of the device of Fig. 2 are omitted, while the remaining two screws serve the double duty in securing the final meter installation. The sealing of the screws to the outermost of the superposed apertured closure members may in all cases be afforded by such means as are disclosed for example in Fig. 4.

Single or multiple meter installations may be effected easily and rapidly with the fixtures of the invention, and the resulting installation is neat and uniform in appearance and is strong, serviceable and tamper-proof. The invention herein is not to be considered as limited to the specific construction shown since the same may be readily varied in various respects within the spirit of the invention and the scope of the appended claims.

What is claimed is:

1. In a universal meter installation fixture, a cabinet forming element having an open side, a pair of separable superposed, concentrically apertured substantially flat closure members for the open side of said element, securing means for one of said closure members adjacent the edge of its aperture, said securing means being inaccessible and concealed beneath the other of said closure members in the operative position thereof, and securing means extending through the last mentioned closure member and into the first mentioned closure member.

2. In a universal meter installation fixture, a trough element having an open side, a meter support therein and accessible through said open side, a closure for said open side comprising an apertured cover and an apertured meter trim ring member superposed on the cover and partially closing the aperture in said cover, securing means passing through the exterior of said cover adjacent the edge of its aperture, and securing means passing through said trim member into said cover.

3. In a universal meter installation fixture, a trough element having an open side, means to support a meter in the trough, an apertured cover for the open side of the trough, cover support means fixed within the trough, securing means adjacent the periphery of the aperture in said cover for entry into said cover support means and an apertured meter trim ring member superposed on and sealably secured to said apertured cover with the peripheral portion of its aperture partially closing the aperture in the cover, said trim member snugly engageable about a meter in the trough and rendering the cover securing means inaccessible and concealed.

4. In a universal meter installation fixture, a trough element having an open side and an open end, said end arranged and adapted for selectively receiving an end wall and a ganging member, a meter support including cover support members at opposite sides thereof in the trough, an apertured cover for the open side of the trough and adapted to be removably secured to the cover support members adjacent the edge of the aperture, securing means extending through the cover from the exterior face thereof into said cover support members, and an apertured trim ring member superposed on the cover over the aperture therein, said trim member concealing the covering securing means.

5. In a universal meter installation fixture, the combination of a trough element having an open side, means to support a meter in the trough element, cover support means fixed within said trough substantially flush with the front opening of the trough element, an apertured cover seating over the open front of the trough element and adapted adjacent the periphery of the aperture therein for the reception of fastening means whereby the cover is removably securable to the cover support means, an apertured meter trim ring member superposed on the cover over the location of the cover securing means and sealable fastening means for securing the trim member in position and rendering the cover securing means inaccessible.

6. In a universal meter installation fixture, a cabinet forming element having an open side, means to support a meter within said element, an apertured cover for said element with its aperture so located that a meter in the cabinet forming element may project through said aperture, means adjacent the edge of the aperture for securing the cover over the open side of the element and permitting a meter therein to project through the aperture, an apertured trim member adapted for slidable mounting over the projecting end of such a meter and having a flat rim for abutment on the cover, and means for sealably securing the trim member in position on the cover and rendering the cover-securing means inaccessible and concealed.

7. A universal protective electric meter installation comprising an open sided trough element, an electric meter removably mounted therein, said meter being shouldered intermediate the front and rear thereof and having its forward portion projecting outwardly of the open side of said trough element, an apertured cover removably connected with the trough element adjacent the aperture, an apertured trim member superposed on the cover member and snugly embracing the projecting portion of the meter adjacent the shoulder of the meter, and sealable means for securing the trim member on the cover member and rendering the cover securing means inaccessible.

8. A universal protective electric meter installation comprising the combination of an open sided and open end trough element adapted at its open ends for the selective reception of end wall members, and connectors for the relatively opposite end of similar trough elements, an electric meter removably mounted within said trough element, an apertured closure member adapted to loosely embrace the mounted meter, a trim member adapted to snugly embrace the mounted meter in spaced relation to the cover member, means adjacent the edge of the aperture in the cover member for removably securing the cover in position on the trough and concealed by the trim member, and sealable fastening means for securing the trim member to the cover member.

9. A universal protective electric meter installation comprising in combination, an open sided and open ended cabinet element, said element adapted at its open end for the selective connection with a similar cabinet element and an end wall, a selected electric meter removably mounted in the cabinet element, an apertured cover member for the open side of a cabinet member with the forward portion of the meter projecting freely through the aperture thereof, means adjacent the aperture for removably securing the cover member in position, a trim member apertured for snugly embracing the protruding portion of the meter, and means for sealably securing said trim member in superposed relation to the cover for completely closing the aperture in the cover and rendering the cover securing means inaccessible.

10. A universal protective gang installation of electric meters comprising a plurality of open ended and open sided cabinet forming elements having adjacent ends connected to form a continuous trough, means in each of said elements for interchangeably mounting therein various types and makes of electric meters, selected meters mounted by said means in the respective elements with the clockwork portion of each meter protruding through the open side of its containing element, interchangeable apertured closure cover members on each element loosely embracing the respective protruding meter clockworks, meter trim members snugly fitting the said meter clockworks respectively and superposed on the closure cover members, and sealable means to independently secure each closure cover member and its associated meter trim member to a cabinet forming element.

JOSEPH N. BLANK.